(12) United States Patent
Penfold et al.

(10) Patent No.: US 12,384,324 B2
(45) Date of Patent: Aug. 12, 2025

(54) TONGUE ASSEMBLY

(71) Applicant: APV Corporation Pty Ltd, Campbellfield (AU)

(72) Inventors: Harrison Luke Penfold, Campbellfield (AU); Cameron Scott Hickling, Campbellfield (AU); Harry Charles William Hickling, Campbellfield (AU); Douglas Lewis Moss Keesing, Campbellfield (AU)

(73) Assignee: APV CORPORATION PTY LTD., Campbellfield (AU)

( * ) Notice: Subject to any disclaimer, the term of this patent is extended or adjusted under 35 U.S.C. 154(b) by 118 days.

(21) Appl. No.: 17/926,770

(22) PCT Filed: May 19, 2021

(86) PCT No.: PCT/AU2021/050467
§ 371 (c)(1),
(2) Date: Nov. 21, 2022

(87) PCT Pub. No.: WO2021/232097
PCT Pub. Date: Nov. 25, 2021

(65) Prior Publication Data
US 2023/0202424 A1 Jun. 29, 2023

(30) Foreign Application Priority Data
May 20, 2020 (AU) ................................ 2020901613

(51) Int. Cl.
*B60R 22/30* (2006.01)
*A44B 11/25* (2006.01)
*B60R 22/12* (2006.01)

(52) U.S. Cl.
CPC .......... *B60R 22/30* (2013.01); *A44B 11/2553* (2013.01); *A44B 11/2561* (2013.01); *B60R 22/12* (2013.01)

(58) Field of Classification Search
CPC ............ A44B 11/2553; A44B 11/2561; A44B 11/2549; A44B 11/2557; B60R 22/30;
(Continued)

(56) References Cited

U.S. PATENT DOCUMENTS

| 4,551,889 A | 11/1985 | Narayan |
| 4,962,572 A | 10/1990 | Prentkowski |

(Continued)

FOREIGN PATENT DOCUMENTS

| WO | 2011062966 A1 | 5/2011 |
| WO | 2013099590 A1 | 7/2013 |

OTHER PUBLICATIONS

International Search Report and Written Opinion from PCT/AU2021/050467, mailed Jul. 19, 2021 (11 pages).

*Primary Examiner* — Jason W San
*Assistant Examiner* — Rowland Do
(74) *Attorney, Agent, or Firm* — Quarles & Brady, LLP (57) ABSTRACT

A locking tongue assembly for a seatbelt system includes a body having a belt webbing opening through which a belt webbing is passable and in which a cinch bar is locatable for cinching the belt webbing, the cinch bar having a main body portion and first and second end portions, the belt webbing opening being defined by axially spaced apart first and second sidewalls, each of which is adapted to receive a respective end portion of the cinch bar, and a stop portion in the belt webbing opening for urging against the main body portion of the cinch bar.

11 Claims, 8 Drawing Sheets

(58) Field of Classification Search
CPC ............ B60R 22/12; B60R 2022/1812; B60R 2022/285; Y10T 24/4016; Y10T 24/4047; Y10T 24/45241; Y10T 24/4084
See application file for complete search history.

(56) References Cited

U.S. PATENT DOCUMENTS

| | | | |
|---|---|---|---|
| 5,058,244 A | 10/1991 | Fernandez | |
| 5,806,148 A * | 9/1998 | McFalls | A44B 11/2561 24/171 |
| 5,870,816 A | 2/1999 | McFalls | |
| 9,409,537 B2 * | 8/2016 | Zhang | B60R 22/28 |
| 2007/0050953 A1 | 3/2007 | Versellie | |
| 2012/0068520 A1 * | 3/2012 | McFalls | A44B 11/2561 24/593.1 |
| 2013/0341994 A1 | 12/2013 | Boughner | |
| 2015/0314749 A1 | 11/2015 | Moker | |
| 2016/0206050 A1 * | 7/2016 | Aoyagi | B60R 22/30 |
| 2017/0144623 A1 * | 5/2017 | Cahill | B60R 22/28 |
| 2018/0220749 A1 * | 8/2018 | Kato | A44B 11/2561 |
| 2019/0135224 A1 * | 5/2019 | Krambeck | B60R 22/1855 |
| 2019/0263349 A1 | 8/2019 | Ruthinowski | |
| 2021/0345734 A1 * | 11/2021 | Hermann | A44B 11/2557 |

* cited by examiner

Detail B

Detail F

Detail F'

TONGUE ASSEMBLY

CROSS REFERENCES TO RELATED APPLICATIONS

This application is a U.S. National Stage of International Application No. PCT/AU2020/050467, filed May 19, 2021, and entitled "TONGUE ASSEMBLY," which claims priority to Australian Patent Application No. 2020901613, filed on May 20, 2020, which are each hereby incorporated by reference in their entirety.

FIELD OF THE INVENTION

The invention relates to a locking tongue assembly for a seatbelt system.

BACKGROUND

Existing locking tongues assemblies have a cinch bar that is located in a locking tongue body for clamping a belt webbing as a safety feature. Existing locking tongue assemblies are prone to vandalism. In particular, a person could easily pull or dislodge the cinch bar from the locking tongue body thereby disabling or compromising the safety feature of the locking tongue assembly.

There is a need for improved locking tongue assembly that is tamperproof and/or that cannot be disassembled.

Accordingly, it is desired to address one or more of the above or at least provide a useful alternative.

SUMMARY OF THE INVENTION

According to an aspect of the present invention, there is provided a tongue assembly for a seatbelt system, the tongue assembly including: a body having a belt webbing opening through which a belt webbing is passable and in which a cinch bar is locatable for cinching the belt webbing, the cinch bar having a main body portion and first and second end portions, the belt webbing opening being defined by axially spaced apart first and second sidewalls each of which is adapted to receive a respective end portion of the cinch bar, and a stop portion in the belt webbing opening for urging against the main body portion of the cinch bar when the cinch bar is in a first position in which only the first end portion of the cinch bar is received by a first sidewall while the second end portion is aligned with the second sidewall without being received by the second sidewall, wherein moving the cinch bar from the first position towards the second sidewall in a second position where the second end portion of the cinch bar is received by the second sidewall results in the body portion of the cinch bar being removed from the stop portion, wherein, in the second position, the first sidewall still receives a portion of the first end portion, and wherein the stop portion prevents movement of the main body portion towards the first sidewall thereby trapping the cinch bar within the belt webbing opening.

The cinch bar is preferably rotatable in the belt webbing opening when the cinch bar is in the second positon to cinch the belt webbing. The stop portion preferably resists rotation of the cinch bar when the cinch bar is in the first position.

When the cinch bar is in the first position, the second end portion of the cinch bar is up to about 3.5 mm from the second sidewall. Preferably the second end portion of the cinch bar is between about 0.1 mm and 3.5 mm from the second sidewall. Further preferably, the second end portion of the cinch bar is up to about 2.3 mm from the second sidewall. In other embodiments, the second end portion is about 1.5 mm from the second sidewall when the cinch bar is in the first position.

The tongue assembly preferably further includes the cinch bar. The main body and the two end portions of the cinch bar may be integrally formed as a single piece.

The first end portion of the cinch bar may be frustoconical. In some embodiments, each of the first and second end portions are frustoconical. The frustoconical end portion may have a tapered wall portion at an angle of up to 30° to a longitudinal angle through the cinch bar. Preferably, the tapered wall is at an angle of up to about 10°. Further preferably, the angle of the tapered wall is between 1° and about 5° inclusive to a longitudinal axis through the cinch bar. More preferably, the angle is at least about 2°.

The first end portion of the cinch bar is preferably longer than the second end portion of the cinch bar. The first end portion may be at least 1.5 times a length of the second end portion. Preferably, the first end portion is at least 2.0 times the length of the second end portion.

The first sidewall preferably has an aperture for receiving the first end portion, the aperture being defined by tapered wall portion to define a narrow or restricted opening into the aperture. The second sidewall preferably also has an aperture for receiving the second end portion. The aperture in the second side wall may also be defined by a tapered wall portion to define a narrow or restricted opening into the aperture. Alternatively, the aperture in the first or second sidewalls may be substantially cylindrical.

The stop portion preferably creates an interference to the cinch bar in the first position.

A range of side-to-side movement of the cinch bar in the belt webbing opening after the cinch bar is in the second position is may be less than each of the first and second end portions.

A distance of the first sidewall to an edge of the stop portion against which the cinch bar is braceable is preferably less than a length of the first end portion.

The stop portion may be adjacent to the first end portion. The stop portion preferably defines a step in the belt webbing opening. When the cinch bar is in the second position, the step preferably provides an overlap of up to about 4.0 mm with the cinch bar. Preferably, the overlap is at least about 0.1 mm. An amount of overlap between the step and the cinch bar preferably varies depending on a rotation of the cinch bar in the opening.

A distance of the first sidewall to the step is preferably less than a length of the first end portion. The distance may be up to about 5.0 mm. Preferably, the distance is at least about 0.2 mm. When the cinch bar is against the second sidewall, the first end portion of the cinch bar is preferably trapped by the first sidewall. When the cinch bar is against the stop portion, the second end portion of the cinch bar is trapped by the second sidewall.

According to another aspect of the present invention, there is provided a method of assembling a tongue assembly for a seatbelt system, the tongue assembly including a body having a belt webbing opening through which a belt webbing is passable and in which a cinch bar is locatable for cinching the belt webbing, the cinch bar having a main body portion and first and second end portions, the belt webbing opening being defined by axially spaced apart first and second sidewalls each of which is adapted to receive a respective end portion of the cinch bar, and a stop portion in the belt webbing opening between the first sidewall and the second sidewall, the method including: inserting the cinch bar at an angle into the belt webbing opening such that the first end portion of the cinch bar is received by the first sidewall; aligning the second end of the cinch bar with the second sidewall such that the stop portion urges against the main body portion of the cinch bar; and moving the cinch bar towards the second sidewall such that the second end of the cinch bar is received by the second sidewall and the body portion of the cinch bar is removed from the stop portion while the first sidewall still receives a portion of the first end portion, wherein the stop portion prevents movement of the main body portion towards the first sidewall thereby trapping the cinch bar within the belt webbing opening.

The cinch bar is preferably rotatable when the main body portion of the cinch bar is clear of the stop portion. The method may further include passing the belt webbing through the belt webbing opening when the main body portion of the cinch bar is clear of the stop portion.

According to a further aspect of the present invention, there is provided a tongue assembly for a seatbelt system, the tongue assembly including: a body having a belt webbing opening through which a belt webbing is passable, the belt webbing opening being defined by axially spaced apart sidewalls, and a cinch bar in the belt webbing opening, the cinch bar having a main body portion for cinching the belt webbing and first and second end portions each of which is trapped by a respective one of said sidewalls as the cinch bar is moved within the belt webbing opening thereby preventing removal of the cinch bar from the belt webbing opening.

The main body and the two end portions of the cinch bar may be integrally formed as a single piece. The cinch bar has no moving parts.

The tongue assembly may further include a stop feature in the belt webbing opening, wherein the stop feature is configured to prevent movement of the cinch bar towards one of the two sidewalls to thereby trap the end portion in the other sidewall. The stop feature preferably provides an interference fit to the cinch bar when it is inserted into the belt webbing opening.

The first end portion of the cinch bar is preferably longer than the second end portion.

A further aspect of the present invention provides a cinch bar for a locking tongue assembly, the cinch bar including: an elongate portion member for cinching a belt webbing; and a first end portion and a second end portion on opposite ends of the body member, the first end portion having a length greater than a length of the second end portion.

The elongate body portion and the two end portions of the cinch bar are preferably integrally formed as a single piece. The cinch bar may be formed of a rigid material that resists deformation. For example, the cinch bar may be formed from a rigid plastic material.

At least one of the first end portion and second end portion is substantially frustoconical. Preferably, both of the end portions is substantially frustoconical. In other embodiments, only one of the end portions is substantially frustoconical.

Preferably, the cinch bar may be configured for the locking tongue assembly of the previously described aspects of the invention.

BRIEF DESCRIPTION OF THE DRAWINGS

The invention will now be described, by way of non-limiting example only, with reference to the accompanying drawings, in which.

DETAILED DESCRIPTION

Figure 1A:
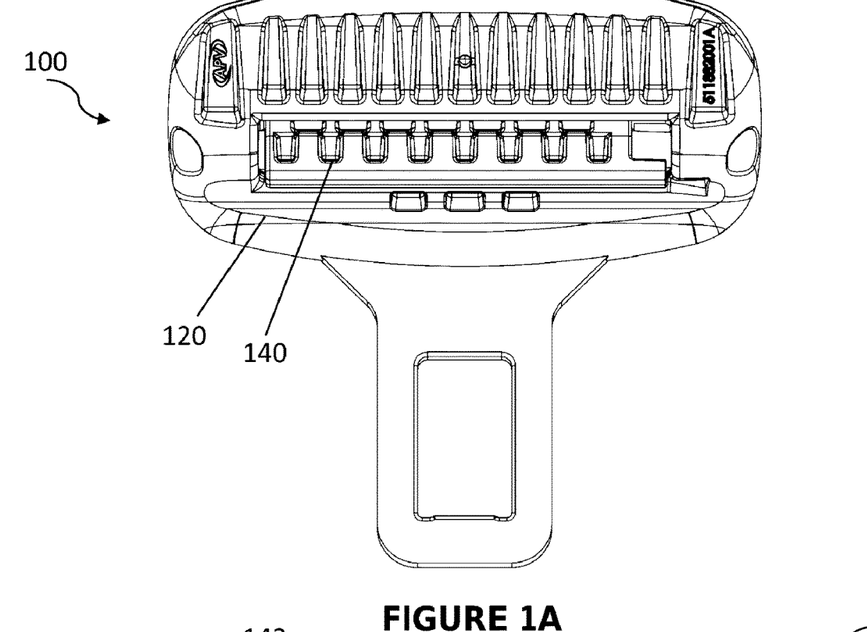
FIGS. 1A and 1B show a plan view and an exploded perspective view respectively of a tongue assembly according to a first embodiment of the present invention.
Figure 1B:
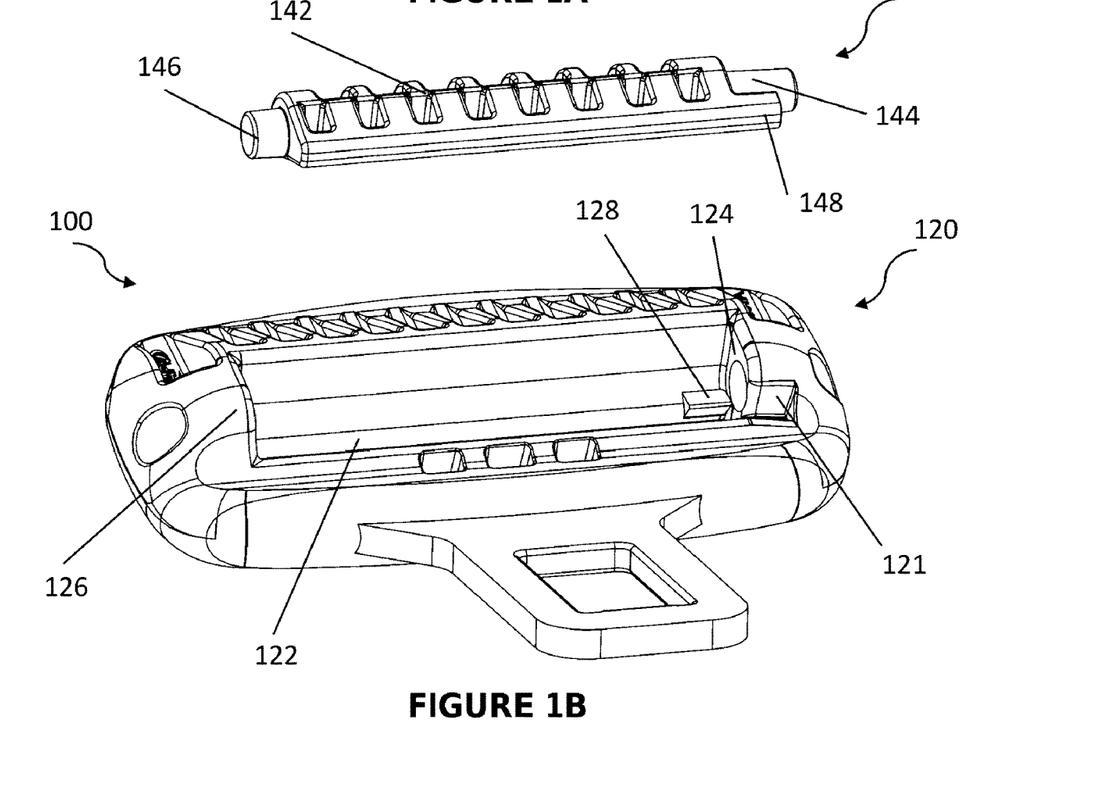

FIGS. 1A and 1B illustrate a locking tongue assembly 100 for a seatbelt system according to an embodiment of the present invention. The locking tongue assembly 100 is for use with a three-point continuous loop seat belt system.

The tongue assembly 100 has a tongue body 120 having a belt webbing opening 122 through which a belt webbing is passable and in which a cinch bar 140 is locatable for cinching the belt webbing. Once the cinch bar 140 is located within the opening 122, the cinch bar cannot be removed from the tongue body 120. After the belt webbing is threaded through the opening, it would be even more difficult for the cinch bar to be removed from the tongue body. The cinch bar is rotatable about a central axis within the opening 122. In addition, the cinch bar is slidable along the central axis within the opening. The opening 122 has a rough texture at the cinching surface to increase the cinch holding force.

The cinch bar 140 has a main body portion 142, a first end portion 144, and a second end portion 146. The main body 142 and the two end portions 144, 146 of the cinch bar are integrally formed as a single unitary piece. The cinch bar 140 has no moving parts.

The cinch bar additionally includes a key portion (or a tab portion) 148 near the first end portion 144 that is engagable with a slot 121 of in a first sidewall defining the belt webbing opening 122 to guide the cinch bar as it is inserted into the opening and to reduce webbing abrasion around the first end portion of the bar. In other embodiments, the cinch bar does not have a key portion.

The main body portion 142 is an elongate member having a length that is less than a length of the belt webbing opening 122. However, a total length of the cinch bar 140, from the first end portion to the other end portion, is greater than the length of the opening 122. The main body portion 142 has a plurality of spaced apart ribs along its length. A cross-sectional profile of the body portion 142 is larger than a cross-sectional profile of each of the first and second end portions 144, 146. The main body portion may be substantially cylindrical with an irregular shape. For example, the main body may have an egg-shape or oval shape.

Each of the first and second end portions 144, 146 are provided at opposite ends of the main body portion 142 of the cinch bar. The end portions are adapted to engage, or locate in, sidewalls of the tongue body 120 that define the opening 122. As the cinch bar 140 is rotated about the central axis and/or slid along the central axis in the opening 122, the cinch bar would remain trapped within the belt webbing opening 122. In particular, both the first and second end portions of the cinch bar 140 will remain trapped within respective sidewalls of the tongue body as the cinch bar is rotated and/or slid in the opening thereby preventing removal of the cinch bar from the opening.

The first end portion 144 has a length of about 4.0 mm to about 11.0 mm. The first end portion of the cinch bar is frustoconical. The frustoconical end portion has a tapered wall portion at an angle of about 2° to a longitudinal axis through the cinch bar. In other embodiments, the frustoconical end portion has a tapered wall portion that is at an angle of between about 1 to 5°, or up to 30°, to a longitudinal axis through the cinch bar. The tapered wall of the first end portion facilitates the insertion of the cinch bar into the respective sidewall of the body 120. In particular, there is some clearance between the tapered wall portion and aperture in the sidewall into which the end portion is located, which allows the cinch bar to be angled into the respective sidewall of the tongue body 120 and pushed into the opening. To insert the cinch bar 140 in the opening 122, the cinch bar is angled into the tongue body at an angle of between about 5° and 15° to the central axis through the opening and pushed into the opening.

The second end portion 146 is shorter than the first end portion 144. The second end portion 146 has a length of about 2.0 mm to 6.0 mm. The second end portion 146 has a substantially cylindrical shape. In other embodiments, the second end portion may also have a frustoconical shape. The second end portion 146 is shorter than then first end portion 144. The second sidewall 126 of the tongue body braces against the main body portion of the cinch bar when the cinch bar is moved towards the second wall. When the cinch bar braces against the second sidewall of the tongue body, the first end portion of the cinch bar will remain trapped by the first sidewall.

The first and second end portions have a substantially circular profile. The circular profile of the first and second end portions 144, 146 enable the cinch bar to rotate within the belt webbing opening. As described above, the first and second end portions 144, 146 can be frustoconical. In other embodiments, the first and second end portions are both cylindrical in shape.

The belt webbing opening 122 is defined by axially spaced apart first and second sidewalls 124, 126. Each sidewall 124, 126 is adapted to receive a respective end portion 144, 146 of the cinch bar. In particular, the first sidewall 124 is for receiving the first end portion 144 of the cinch bar, and the second sidewall 126 is for receiving the second end portion 146 of the cinch bar. Each sidewall 124, 126 has an aperture (or channel) in which the respective end portion of the cinch bar is locatable. Each aperture is generally cylindrical, having a substantially tapering cross-sectional area through the depth of the aperture such that the aperture has a narrow opening. The aperture is tapered outwardly into the sidewall. That is, a cross-sectional area of the aperture at one end of the aperture on the face of the sidewall is smaller than a cross-sectional area of the aperture at an opposite end of the aperture. The aperture in each sidewall is dimensioned to be larger, or at least slightly larger, than the circular profile of the respective first and second end portions of the cinch bar as previously described. The belt webbing opening 122 accommodates the irregular shape of the main body portion 142 of the cinch bar 140, as previously discussed above, and allows for a forward and rearward rotation of the cinch bar in the opening 122. When the end portions of the cinch bar are located in the respective sidewalls, the first and second end portions would not hold any load. There is a clearance between the end portion and the walls of the aperture surrounding the end portion. In other embodiments, when the cinch bar is located in the opening, the first and second portions hold some load.

The tongue body 120 include a stop portion (or stop feature, or trapping portion) 128 in the belt webbing opening 122. The stop portion 128 provides a step within the belt webbing opening 122. The stop portion 128 is for limiting a sliding or lateral movement of the cinch bar in the belt webbing opening 122. In particular, when the cinch bar 120 is located within the belt webbing opening, the stop portion 128 provides a surface against which a portion of the cinch bar 120 is braceable to prevent movement of the cinch bar towards the stop portion 128. The stop portion 128 is located adjacent or near the first sidewall 124 that receives the first end portion 144 of the cinch bar. The stop portion 128 prevents movement of the main body portion 142 of the cinch bar towards the first sidewall to any extent that the second end portion of the cinch bar would be free of the second sidewall—thereby, the second end portion of the cinch bar would remain trapped by the second sidewall. As previously described above, the first end portion of the cinch bar would remain trapped by the first sidewall when the cinch bar is moved towards the second sidewall. Accordingly, because both of the first and second end portions are trapped by the first and second sidewalls of the locking tongue body over a full range of movement of the cinch bar in the belt webbing opening, the cinch bar is prevented from removal from the tongue body. The stop portion defines a step in the opening 122 or an area of increased thickness in the opening 122. The step provides an overlap of about 0.1 mm with the cinch bar body when the belt webbing is not provided through the opening 122 and an overlap of up to about 2.5 mm when the belt webbing is provided through the opening 122. In other embodiments, the overlap may be up to about 4.0 mm when the belt webbing is provided through the opening.

The stop portion 128 extends from the first sidewall and has a length that is less than a length of first end portion of the cinch bar and greater than a length of the second end portion of the cinch bar. The length of the stop portion 128 is about 0.2 mm. In other embodiments, the length may be up to about 5.0 mm, such as from about 2.0 mm to about 5.0 mm, for example, from about 3.5 mm to about 4.5 mm. In other embodiments, the stop portion may be separate from the first sidewall and located within a distance from the first sidewall that is less than each of the first and second end portions. In further embodiments, there may be a plurality of spaced apart stop portions within the belt webbing opening.

The stop portion 128 additionally provides an interference fit for the cinch bar during assembly of the locking tongue assembly when the cinch bar is angled into the first sidewall and pushed into belt webbing opening 122. The stop portion 128 urges against the main body portion 142 of the cinch bar when the cinch bar 140 is in a first position in which only the first end portion 144 of the cinch bar 140 is received by a first sidewall 124 while the second end portion 146 is aligned with the second sidewall 126 without being received by the second sidewall 126. Moving the cinch bar 140 from the first position towards the second sidewall 126 in a second position where the second end portion 146 of the cinch bar 140 is received by the second sidewall 126 results in the body portion of the cinch bar 140 being removed from the stop portion 128. In the second position, the first sidewall 124 still receives a portion of the first end portion 144. As the stop portion is an enlarged area that restricts a passage through the opening 122 and because the first and second end portions 144, 146 are trapped by their respective first and second sidewalls 124, 126, main body portion 142 of the cinch bar 140 cannot be moved onto the stop portion after the cinch bar is in the second position. Thereby, the cinch bar 140 would remain trapped in the opening 140 after it is moved to the second position.

The first sidewall, the second sidewall and the stop portion of the tongue body 120 are integrally formed as a single piece. The tongue body 120 is injection molded. Preferably, the tongue body 120 is moulded with respect to a sheet of metal that forms the tongue portion of the tongue body that is insertable into a belt buckle. The tongue body 120 is a rigid plastic component.

When the cinch bar 140 is in the first position, the cinch bar the stop portion resists rotation of the cinch bar. Additionally, when the cinch bar is in the first position, the second end portion of the cinch bar is about 1.5 mm from the second sidewall. In other embodiments, the second end portion is up to about 3.5 mm from the second sidewall when the cinch bar is in the first position. In yet other embodiments, there is no clearance between the second end portion of the cinch bar and the second sidewall when the cinch bar is in the second position.

Figure 2A:
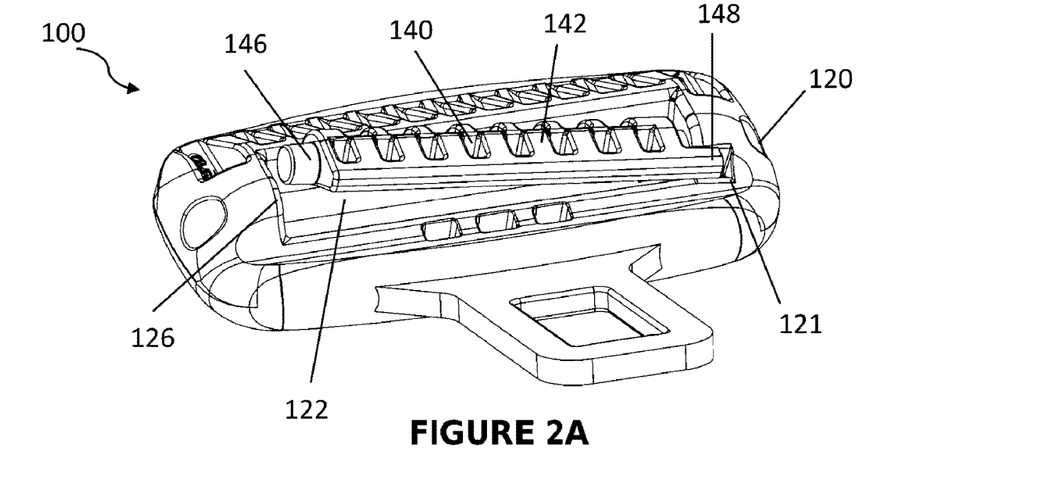
FIGS. 2A to 2E show the cinch bar of the tongue assembly according to the first embodiment of the present invention being inserted into the belt webbing opening of the tongue body.
Figure 2B:
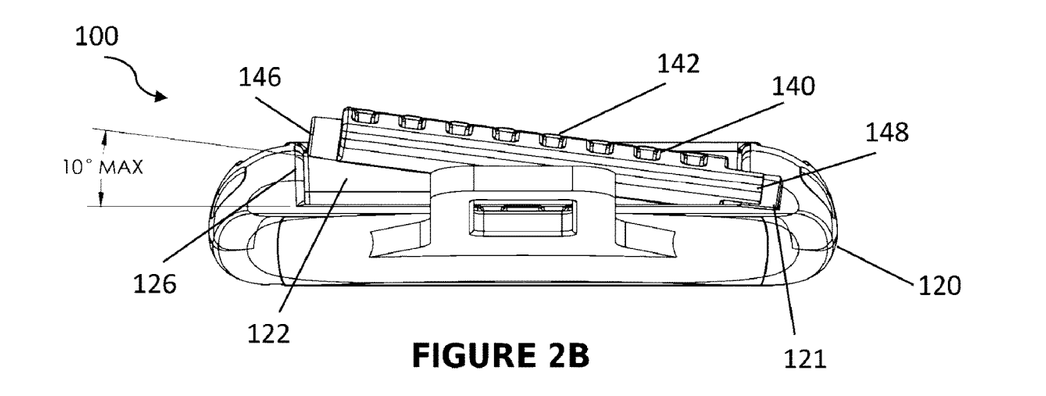
Figure 2C:
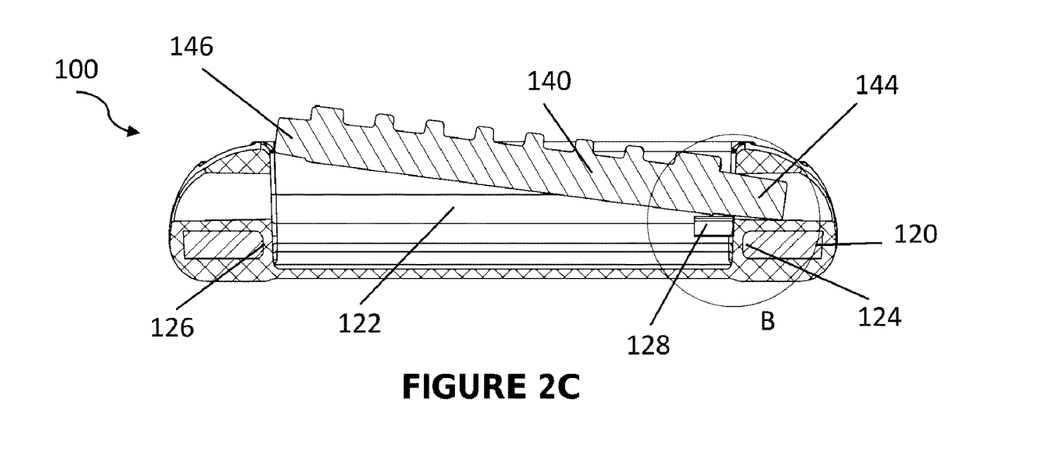
Figure 2D:
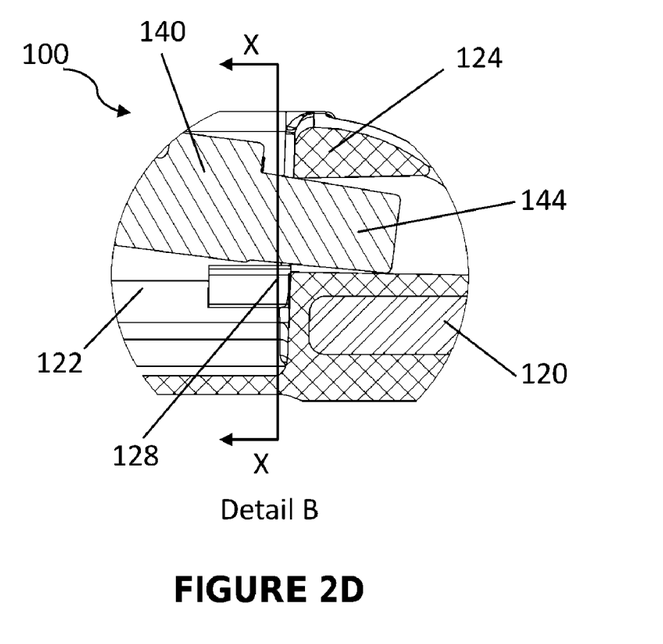
Figure 2E:
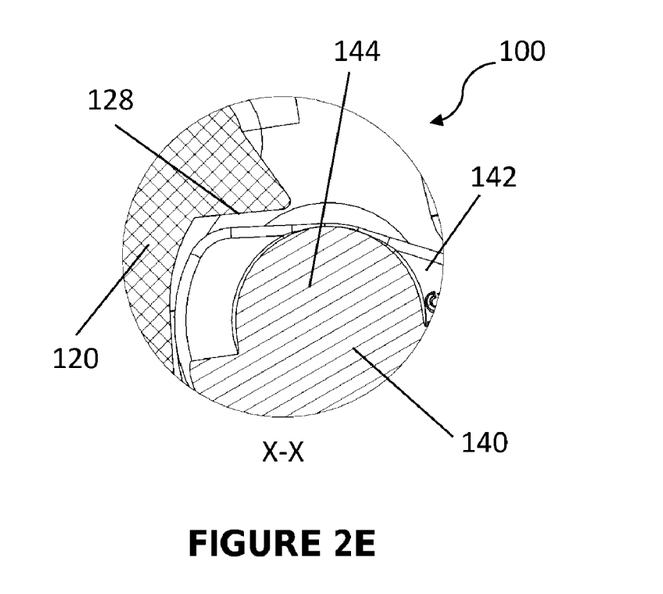

FIGS. 2A to 2E show different views of the locking tongue assembly 100 with the cinch bar 140 being inserted into the belt webbing opening 122 of the tongue body 120. FIG. 2B shows a view from one end of the locking tongue assembly 100, while FIG. 2C is a cross-sectional view of the locking tongue assembly 100 through the central, longitudinal axis of the cinch bar 140. FIG. 2D is a detailed view of area B of FIG. 2C. FIG. 2E is a cross-sectional view taken along line X-X of FIG. 2D. The cinch bar 140 is angled into the opening 122 such that the first end portion 144 of the cinch bar 140 is inserted into the aperture in the first sidewall 124. The angle of insertion of the cinch bar 140 into the opening 122 is up to about 10°. The key portion 148 of the cinch bar 140 is directed towards the slot 121 in the first sidewall 124 as the cinch bar is angled into the opening 122. As the cinch bar 140 is being angled into the first sidewall 124, there is a clearance between the cinch bar 140 and the stop portion 128 such that the cinch bar 140 can be inserted into the first sidewall 124 without any substantial interference from the stop portion 128. The tapered walls of the first end portion 144 and the tapered walls of the aperture in the first sidewall 124 assist in guiding the first end portion 144 into the first sidewall 124. As the cinch bar 140 is angled into and pushed towards the first sidewall 124 to locate the first end portion 144 in the first sidewall 124, the cinch bar 140 will move into the opening 122 such that the second end portion 146 would become aligned with the aperture in the second sidewall 126. In addition, the key portion 148 is inserted into the slot 121 when the cinch bar is angled towards and moved into the opening 122. The second sidewall 126 does not interrupt or block movement of the second end portion 146 of the cinch bar 140 as the cinch bar 140 is moved into the opening 122. In particular, there is sufficient clearance between the second end portion 146 and the second sidewall 126 as the cinch bar 140 is moved into the opening 122.

Figure 3A:
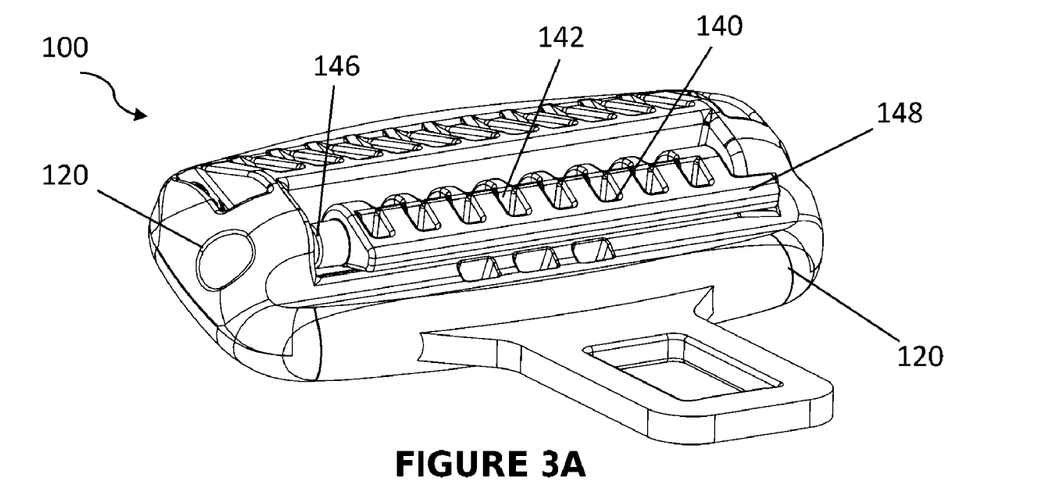
FIGS. 3A to 3E show the cinch bar of the tongue assembly according to the first embodiment of the present invention in a first position in the tongue body.
Figure 3B:
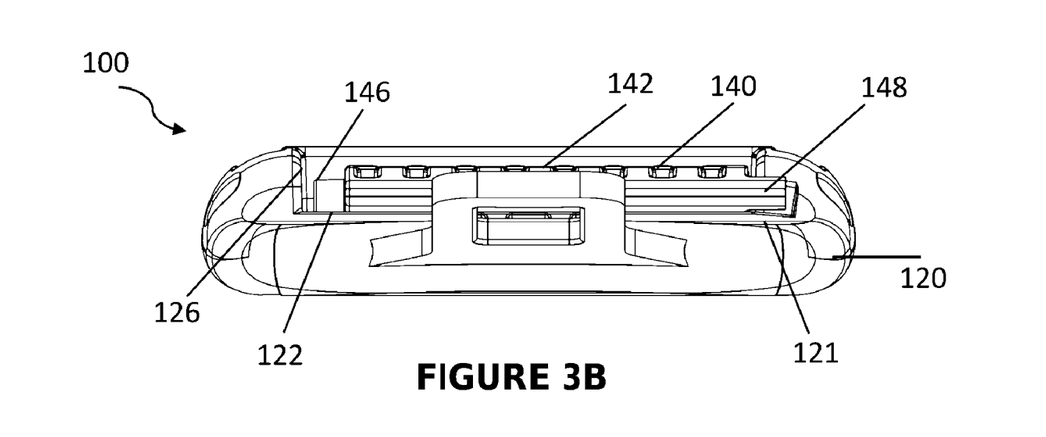
Figure 3C:
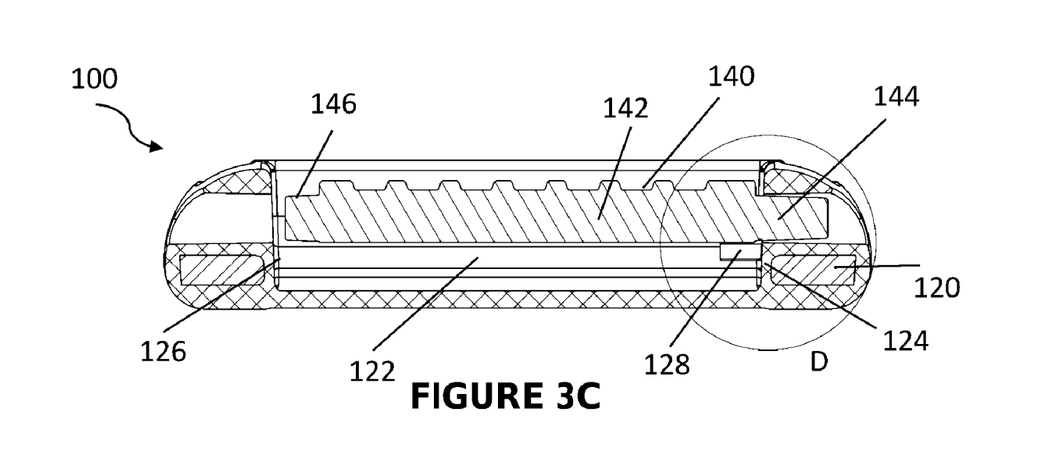
Figure 3D:
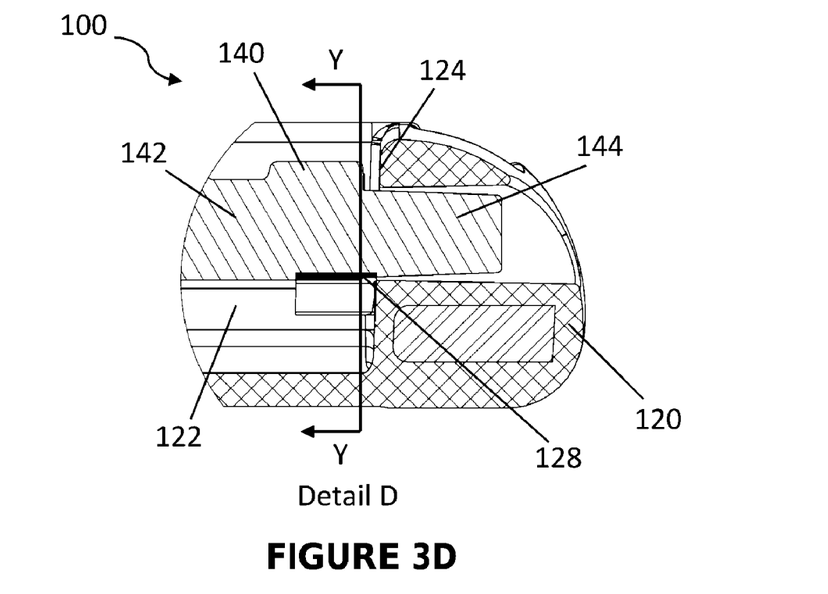
Figure 3E:
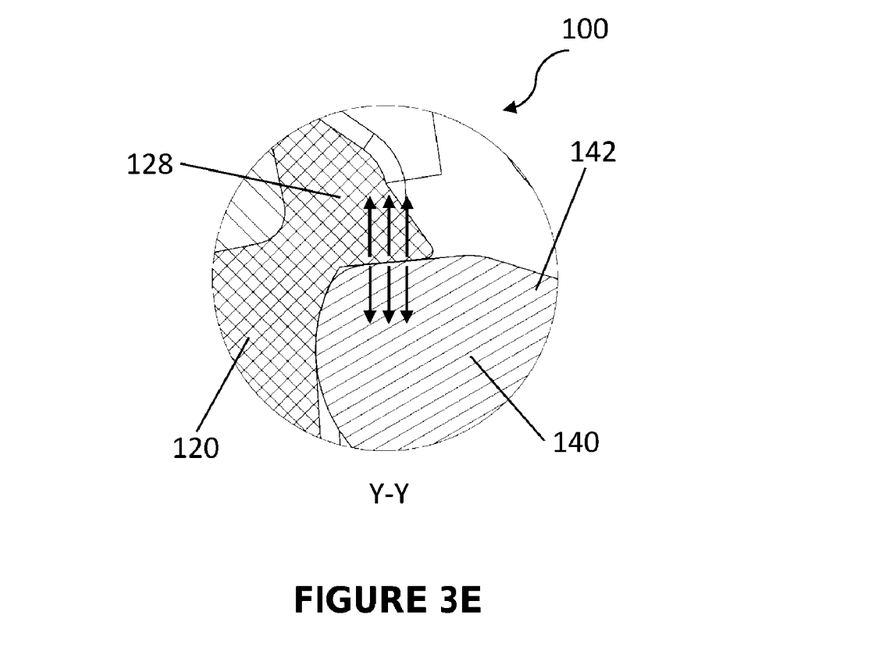

FIGS. 3A to 3E show different views of the locking tongue assembly 100 with the cinch bar 140, in a first position, in which it is aligned within the belt webbing opening 122 of the tongue body 120 after the cinch bar 140 is angled into and pushed towards the first sidewall 124 as previously described. FIG. 3B shows a view from one end of the locking tongue assembly 100, while FIG. 3C is a cross-sectional view of the locking tongue assembly 100 through the central, longitudinal axis of the cinch bar 140. FIG. 3D is a detailed view of area D of FIG. 3C. FIG. 3E is a cross-sectional view taken along line Y-Y of FIG. 3D. In this first position, the key portion 148 is fully inserted into the slot 121 in the first sidewall 124. Also, in this position, the main body portion 142 of the cinch bar 140 urges against the stop portion 128 that is adjacent to the first sidewall 124. The stop portion 128 in particular provides an interference to the cinch bar 140 in the opening 122. The stop portion 128 pushes against the main body portion 142 of the cinch bar 140 and forces (or biases) the cinch bar 140 outwards from the opening 122 as indicated by the arrows in FIG. 3E. The main body portion 142 and the stop portion 128 are made from a rigid material that resists deformation when the stop portion 128 and the main body portion 142 urge against each other. Further, in the first position, the second end portion 146 of the cinch bar 122 would be aligned with the aperture in the second sidewall 126. There is a spacing or clearance, of up to about 3.5 mm, between the second end portion 146 and the second sidewall 126 when the cinch bar is in the first position.

Figure 4A:
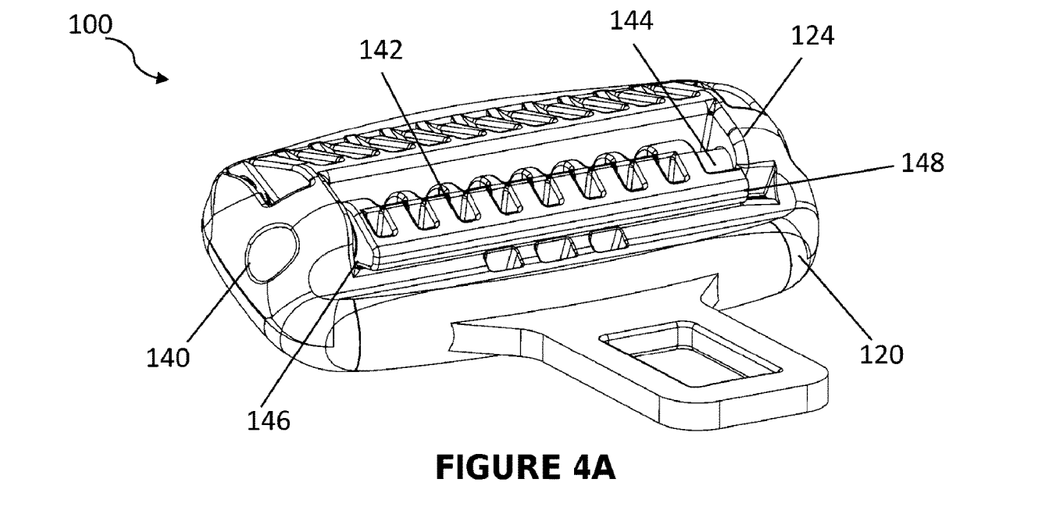
FIGS. 4A to 4G show the cinch bar of the tongue assembly according to the first embodiment of the present invention in a second position in the tongue body.
Figure 4B:
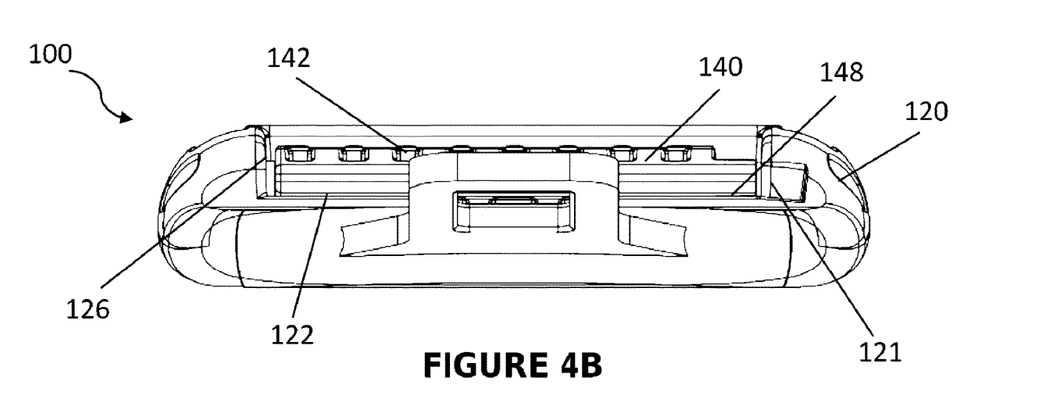
Figure 4C:
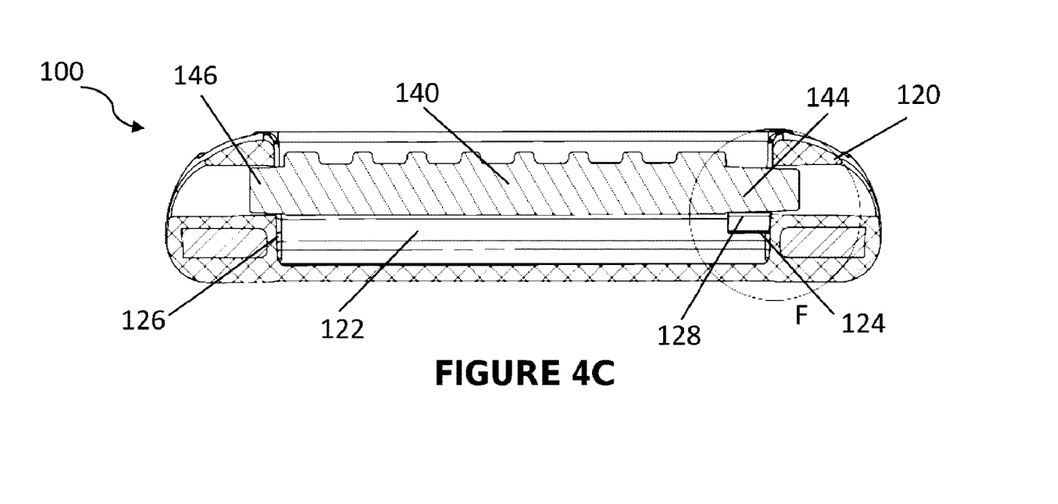
Figure 4D:
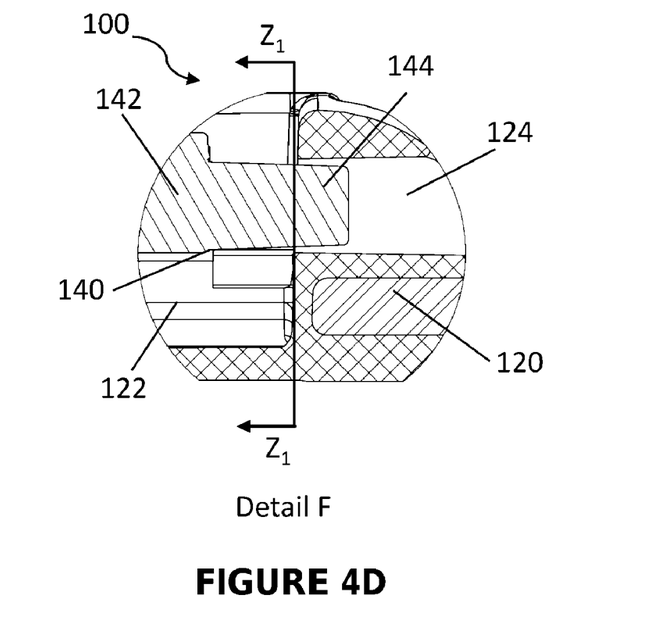
Figure 4E:
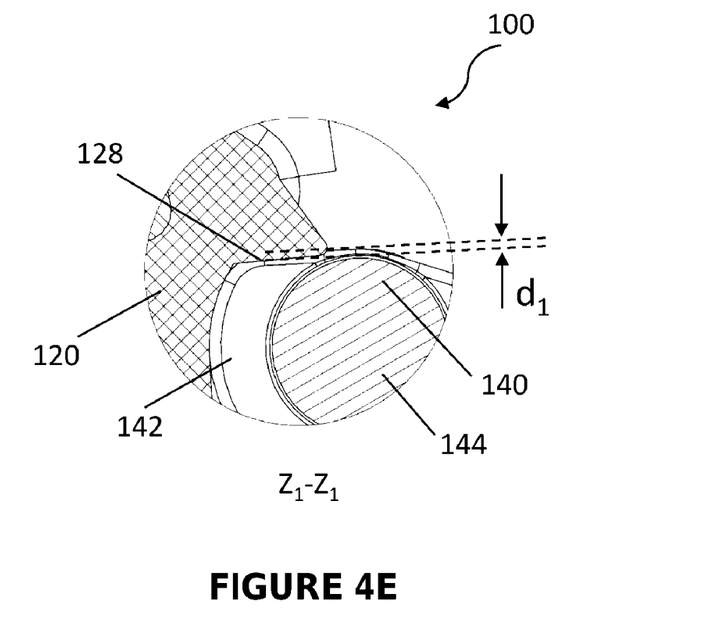

FIGS. 4A to 4E show different views of the locking tongue assembly 100 with the cinch bar 140 moved from the first position towards the second sidewall, in a second position, so as to remove the body portion 142 of the cinch bar from the stop portion 128. FIG. 4B shows a view from one end of the locking tongue assembly 100, while FIG. 4C is a cross-sectional view of the locking tongue assembly 100 through the central, longitudinal axis of the cinch bar 140. FIG. 4D is a detailed view of area F of FIG. 4C. FIG. 4E is a cross-sectional view taken along line $Z_1$-$Z_1$ of FIG. 4D. In the second position, the cinch bar 140 is moved towards the second sidewall 126 such that the second end portion 146 of the cinch bar is at least fully received by the aperture in the second sidewall. The length of the second end portion is less than the length of the stop portion such that the second end portion does not need to be fully located in the second sidewall 126 before the main body portion 142 is removed from the stop portion 128. When the main body portion 142 of the cinch bar is removed from the stop portion 128, the stop portion 128 now limits the range of movement of the cinch bar in the opening 122. In particular, the cinch bar would be restricted by the stop portion 128 from moving towards the first sidewall 124. Due to the stop portion 128, a range of side-to-side (or lateral) movement of the cinch bar 140 in the opening 122 is less than a length of the first end portion 144 of the cinch bar and is less than a length of the second end portion 146 of the cinch bar. The range of side-to-side movement of the cinch bar within the opening is the distance between the stop portion 128 to the second sidewall 126 minus length of the cinch bar body 142. Thereby, the first and second end portions of the cinch bar would remain trapped or locked within the first sidewall over the range of side-to-side movement of the cinch bar 140. When the cinch bar 140 is moved towards the second sidewall 126, the key portion 148 can be freed from the slot 121 of the tongue body 120 thereby allowing the cinch bar 140 to be rotated towards a forward positon or rearward position in the opening 122.

In the second position, and with reference to FIGS. 4D and 4E, when cinch bar 140 is in a rearward position in the opening 122 of the tongue body, there is an overlap $d_1$ of at least about 0.1 mm between the main body portion 142 of the cinch bar and the stop portion 128 in the opening 122 of the tongue body 120. This overlap prevents the main body portion 142 of the cinch bar from moving towards the first sidewall 124. Accordingly, removing the cinch bar 140 from the opening 122 is made difficult.

Figure 4F:
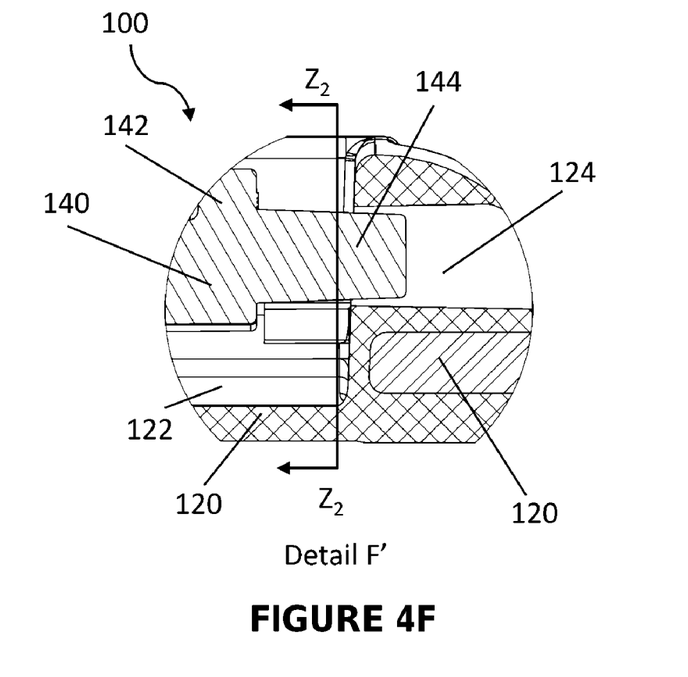
Figure 4G:
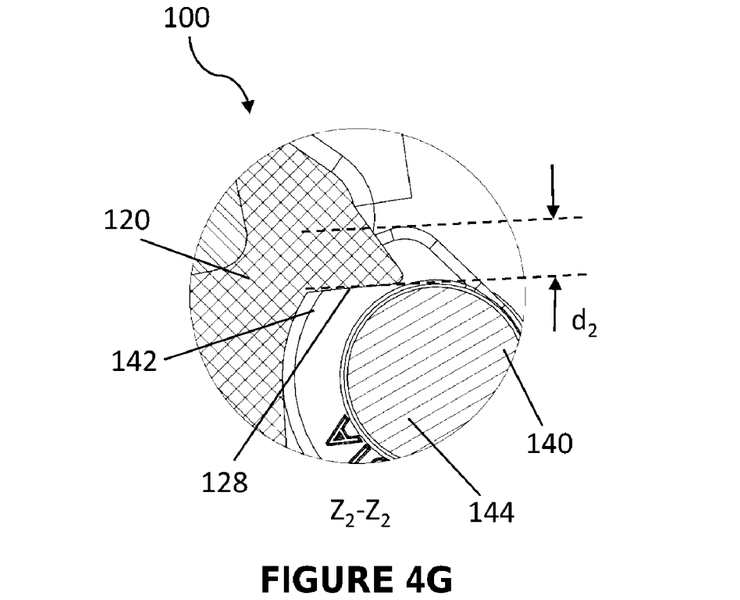

FIG. 4F is a detailed view of area F', which corresponds to area F of FIG. 4C, but shows the cinch bar 140 in a forward position. FIG. 4G is a cross-sectional view taken along line $Z_2$-$Z_2$ of FIG. 4F. In the second position, and with reference FIGS. 4F and 4G, due to the irregular shape of the main body portion 142 of the cinch bar 140, when the cinch bar 140 is in a forward position, there is a larger overlap $d_2$ between the main body portion 142 and the stop portion 128. The overlap is about 2.5 mm. The cinch bar 140 would be in the forward position when belt webbing is passed through the opening. Thereby, once the belt webbing is passed through the opening 122, it would be even more difficult to move the cinch bar towards first sidewall 124 thereby preventing any removal of the cinch bar from the opening 122.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

The claims defining the invention are as follows:

1. A tongue assembly for a seatbelt system, the tongue assembly including:
    a body having a belt webbing opening through which a belt webbing is passable and in which a cinch bar is locatable for cinching the belt webbing, the cinch bar having a main body portion and first and second end portions, the belt webbing opening being defined by axially spaced apart first and second sidewalls each of which is adapted to receive a respective end portion of the cinch bar, and
    a stop portion in the belt webbing opening for urging against the main body portion of the cinch bar when the cinch bar is in a first position in which only the first end portion of the cinch bar is received by a first sidewall while the second end portion is aligned with the second sidewall without being received by the second sidewall,
    wherein moving the cinch bar from the first position towards the second sidewall in a second position where the second end portion of the cinch bar is received by the second sidewall results in the body portion of the cinch bar being removed from the stop portion,
    wherein, in the second position, the first sidewall still receives a portion of the first end portion, and
    wherein the stop portion prevents movement of the main body portion towards the first sidewall thereby trapping the cinch bar within the belt webbing opening.

2. The tongue assembly of claim 1, wherein the cinch bar is rotatable in the belt webbing opening when the cinch bar is in the second position to cinch the belt webbing, and the stop portion resists rotation of the cinch bar when the cinch bar is in the first position.

3. The tongue assembly of claim 1, further including the cinch bar.

4. The tongue assembly of claim 3, wherein the first end portion of the cinch bar is frustoconical.

5. The tongue assembly of claim 4, wherein the first end portion has a tapered wall portion at an angle up to about 5° to a longitudinal axis through the cinch bar.

6. The tongue assembly of claim 3, wherein the first end portion is longer than the second end portion.

7. The tongue assembly of claim 3, wherein the main body and the first and second end portions of the cinch bar are integrally formed as a single piece.

8. The tongue assembly of claim 1, wherein the first sidewall has an aperture for receiving the first end portion, the aperture being defined by tapered wall portion to define a narrow opening into the aperture.

9. The tongue assembly of claim 1, wherein the stop portion provides an interference to the cinch bar in the first position.

10. The tongue assembly of claim 1, wherein a range of side-to-side movement of the cinch bar in the belt webbing opening after the cinch bar is in the second position is less than each of the first and second end portions.

11. The tongue assembly of claim 1, wherein a distance of the first sidewall to an edge of the stop portion against which the cinch bar is braceable is less than a length of the first end portion.

* * * * *